United States Patent [19]

Smith

[11] Patent Number: 5,079,433
[45] Date of Patent: Jan. 7, 1992

[54] METHOD FOR MONITORING FIBER TENSION BY MEASURING FIBER VIBRATION FREQUENCY

[75] Inventor: Gregory E. Smith, Wilmington, N.C.
[73] Assignee: Corning Incorporated, Corning, N.Y.
[21] Appl. No.: 593,204
[22] Filed: Oct. 5, 1990
[51] Int. Cl.$^5$ .............................................. G01N 21/86
[52] U.S. Cl. ....................... 250/561; 65/29; 356/73.1
[58] Field of Search ............... 250/560, 561, 231.1; 350/96.1; 65/160, 162, 29; 356/73.1; 73/862.39, 862.41

[56] References Cited

U.S. PATENT DOCUMENTS

| | | | |
|---|---|---|---|
| 4,317,666 | 3/1982 | Faure et al. | 65/29 |
| 4,343,637 | 8/1982 | Shofner et al. | 356/73.1 |
| 4,692,615 | 9/1987 | Mensah et al. | 250/231 |

Primary Examiner—David C. Nelms
Attorney, Agent, or Firm—William J. Simmons, Jr.

[57] ABSTRACT

A non-contact method for monitoring the tension in an optical waveguide fiber during drawing is provided. The motion of the fiber is sensed in a direction transverse to the direction in which the fiber is moving. The sensed motion is analyzed to determine a plurality of frequency components thereof, each frequency component having a magnitude, and one of the components constituting the maximum magnitude component. The frequency of the maximum magnitude component is doubled to obtain a doubled frequency. The presence of a frequency component near the doubled frequency is ascertained to verify that the maximum magntiude component is the principle harmonic frequency of motion of the fiber. The tension in the fiber is then determined from the verified principal harmonic frequency component.

14 Claims, 4 Drawing Sheets

METHOD FOR MONITORING FIBER TENSION BY MEASURING FIBER VIBRATION FREQUENCY

BACKGROUND OF THE INVENTION

1. Field of the Invention

This invention relates to optical waveguide fibers and, in particular, to a method for monitoring fiber tension during the drawing of such fibers.

2. Description of the Prior Art

In the manufacture of glass optical fiber, the fiber is pulled from the end of a glass preform or draw blank which has been heated to a sufficiently high temperature. One of the more important process parameters in the production of optical waveguide fibers is the tension within the fiber during the drawing process, and, in particular, the tension within the fiber in the region between the hot zone and the first coater. The magnitude of this tension affects the final properties of the fiber, including the fiber's diameter, ultimate strength and, through a stress optic effect, its optical properties.

From a process point of view, the tension in the fiber also affects the overall stability and throughput of the drawing process. Excessive tension leads to rapid necking and ultimate rupture of the fiber in the hot zone region. If not carefully controlled, increasing the temperature of the hot zone to reduce fiber tension can result in draw resonance and root oscillation, which in turn can result in oscillatory variations in fiber diameter which are difficult to control with conventional fiber diameter monitoring equipment. Oscillation of the fiber during drawing can also adversely affect the fiber coating process.

Fiber tension is related to the viscosity of the glass in the root portion of the preform from which the fiber is being drawn, and to the speed with which the fiber is being drawn. Since the viscosity of the glass is a function of temperature, draw tension can be controlled by adjusting the temperature of the furnace.

The temperature of the furnace itself can be measured and controlled using conventional temperature detection techniques such as pyrometers or thermocouples. However, due to the thermodynamics of the draw process, this control does not provide adequate control of the root temperature. The part of the preform above the root acts as a heat sink which reduces the temperature of the root. If the furnace temperature remains constant, the root becomes hotter with a decrease in the size of the preform. A constant temperature furnace will therefore result in a lowering of the draw tension as the preform is reduced in size during the fiber draw process.

Draw tension can be controlled by measuring the draw tension at various times during the draw process, and then modifying furnace temperature to compensate for a reduction in preform length. As the preform size is reduced and the heat sink becomes smaller, the furnace temperature is lowered.

Fiber tension has been monitored mechanically by measuring the deformation of the fiber in response to a force applied transversely to the direction of motion of the fiber. U.K. Patent Application GB 2,179,339A discloses a three wheel device wherein two wheels are applied to one side of the fiber and a third wheel is applied to the other side of the fiber. The location of the third wheel relative to the first two wheels is used as a measure of the tension in the fiber. Application GB 2,179,339A teaches that the measurement is made below the coater, and that the signal from that tensiometer is used to control the temperature of the draw furnace only during the initial set-up procedure when no coating is being applied to the fiber.

The three wheel approach has numerous disadvantages. It is difficult to precisely align the device with the fiber so as not to change the original path of the fiber. Contact of the three wheel device with the fiber affects the on-line fiber diameter feedback loop so as to reduce fiber draw speed. Also, the moving fiber can break when contacted by the three wheel device. A tensiometer is preferably mounted just below the furnace when a coated fiber is being drawn. A break in this location results in lost production since it necessitates the re-starting of the complete draw process.

U.S. Pat. No. 4,692,615 discloses a non-contact method and apparatus for measuring tension in a moving fiber by sensing the motion of the fiber; analyzing that motion to determine at least one of its frequency components; and monitoring the frequency component or components so determined so as to monitor the tension in the fiber. That method is based on the fact that, at least to a first approximation, the vibrational behavior of an optical fiber during drawing corresponds to the vibrational behavior of a string under tension which has been fixed at both ends. The fiber forms a stretched string between the root and the first coating applicator. The wave equation of the stretched string is:

$$F = \mu(2\nu\delta)^2 \qquad \text{Eq. 1}$$

where F is the force on the fiber, $\mu$ is the linear density of the, $\nu$ is the principal harmonic frequency, and $\delta$ is the suspended length of the fiber. If the principal harmonic frequency of vibration is measured, then the force, or tension can be calculated. Occasionally, the frequency peak of maximum magnitude results from noise caused by rotating machinery or other periodic vibration sources rather than the fundamental fiber vibration frequency.

SUMMARY OF THE INVENTION

In view of the foregoing state of the art, it is evident that an improved method for monitoring fiber tension during the drawing of optical fibers is needed. It is the object of the present invention to provide such an improved monitoring system.

More specifically, it is an object of this invention to provide an automated, non-contact optical fiber tension monitoring method which can be used to monitor fiber tension in an on-line, continuous manner. Another object is to provide an improved method for monitoring optical fiber tension in the region between the hot zone and the first coater. A further object is to provide a non-contact fiber tension monitoring method that produces an accurate indication of tension even though fiber vibration includes components that are caused by vibrations from rotating machinery and the like.

To achieve the foregoing and other objects, the invention in accordance with certain of its aspects provides a method for monitoring the tension in a moving fiber comprising the steps of:

(a) sensing the motion of the fiber in a direction transverse to the direction in which the fiber is moving;

(b) analyzing the sensed motion to determine a plurality of frequency components thereof, each frequency component having a magnitude, one of the components constituting the maximum magnitude component;

(c) doubling the frequency of the maximum magnitude component to obtain a doubled frequency $2(f_{m1})$;

(d) ascertaining the presence of a frequency component near frequency $2(f_{m1})$ to verify that the maximum magnitude component is the principal harmonic frequency of motion of the fiber; and (e) determining the tension in the fiber from the verified principal harmonic frequency component.

In accordance with a preferred embodiment of the invention, the second highest frequency component, $f_{m2}$, is also analyzed to determine if there is a frequency component which is near twice the frequency $f_{m2}(2(f_{m2}))$. The component near $2(f_{m1})$ is designated 1st second harmonic, and that near $2(f_{m2})$ is designated 2nd second harmonic. If 2nd second harmonic is closer in frequency to $2(f_{m2})$ than 1st second harmonic is to $2(f_{m1})$, then $f_{m2}$ is considered to be the principal harmonic frequency of motion of the fiber.

A signal indicative of the fundamental fiber vibration frequency can be utilized in a feedback circuit to control the temperature of the draw furnace, thereby controlling the tension of the drawn fiber.

The accompanying drawings, which are incorporated in and constitute part of the specification, illustrate the preferred embodiments of the invention, and together with the description, serve to explain the principles of the invention.

DESCRIPTION OF THE PREFERRED EMBODIMENTS

Figure 1:
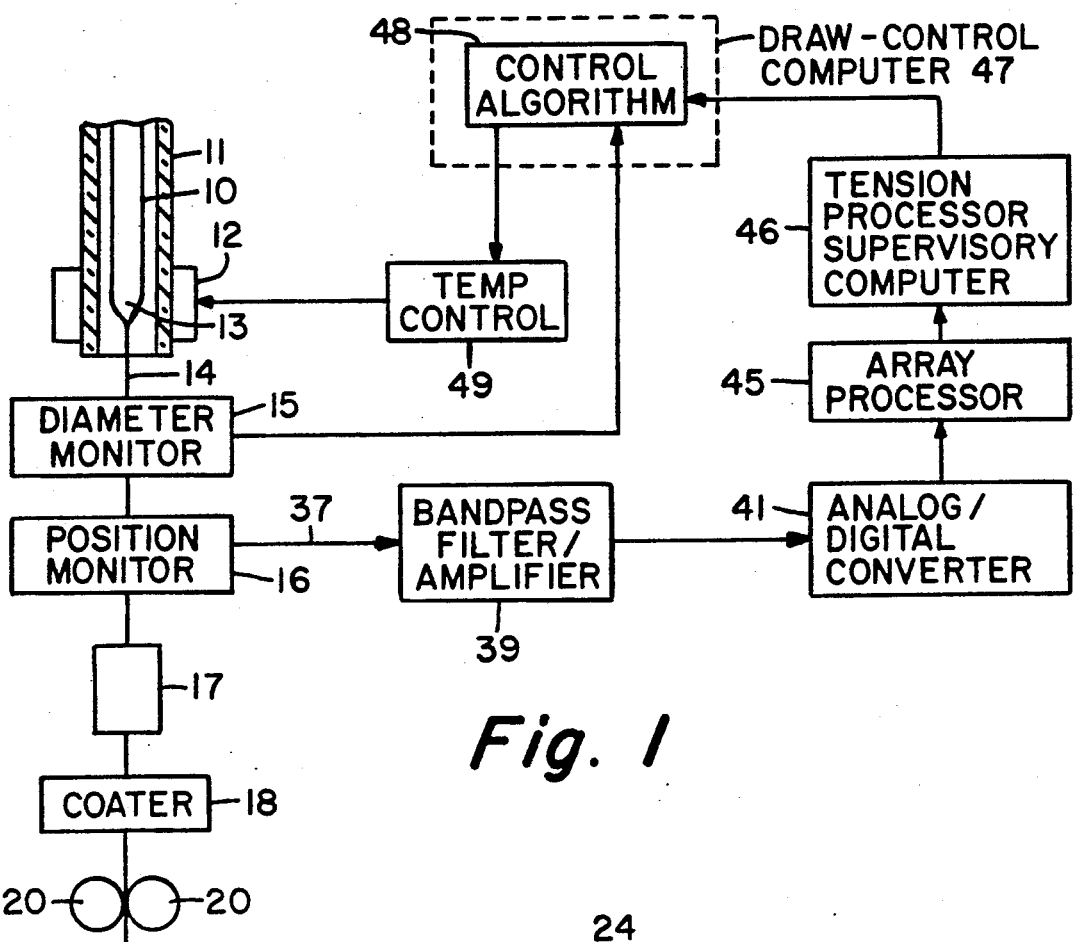
FIG. 1 is a schematic diagram of a fiber drawing apparatus.

Referring to FIG. 1, there is shown an optical fiber draw system wherein glass preform 10 is disposed vertically in muffle 11 of the draw furnace. Heating element 12 supplies heat to at least the bottom portion of preform 10. After a known start-up procedure is employed, fiber 14 is pulled from root portion 13 of preform 10 by tractor 20. After leaving muffle 11, fiber 14 encounters diameter monitor 15 which provides a signal that is used in a feedback control loop that regulates the speed of tractor 20 to maintain a constant fiber diameter. Fiber 14 then passes through position monitor 16, cooling tube 17 and coater 18. The coated fiber may also pass through a coating curing apparatus and, if desired, additional coaters (not shown). The feedback control of the preform drive and the tractor drive can be implemented by control algorithms in accordance with application GB 2,179,339A.

In accordance with the present invention, the following steps are performed to avoid the generation of false tension signals while determining the tension of moving fiber 14:

(a) The motion of fiber 14 in a direction transverse to the direction in which the fiber is moving is sensed at position monitor 16. Any known position monitor, including the reticon system disclosed in U.S. Pat. No. 4,692,615, can be employed, a preferred device being shown in FIG. 3.

(b) The detected motion is analyzed to determine its frequency components as well as the magnitude of each frequency component.

(c) The frequency component, $f_{m1}$, having the maximum magnitude is selected.

(d) The remaining frequency components are analyzed to ascertain whether there is a second harmonic of frequency $f_{m1}$. This step is performed to verify that the maximum magnitude component is the principal harmonic frequency of motion of the fiber. A second harmonic is defined as a frequency component appearing within a given range above or below $2(f_{m1})$, i.e. twice the frequency $f_{m1}$.

(e) The tension in the fiber is then determined from the verified principal harmonic frequency component.

Steps (b) through (e) can be performed by separate processors, a digital computer, an array processor or the like. Step (b), for example could be performed by the spectrum analyzer disclosed in U.S. Pat. No. 4,692,615.

In accordance with a preferred embodiment, the second highest frequency component, $f_{m2}$, is also considered as a possible candidate for the principal harmonic of the motion of the fiber. The remaining frequency components are analyzed to determine if there is second harmonic near $2(f_{m2})$, i.e. twice frequency $f_{m2}$. The component near $2(f_{m1})$ is designated 1st second harmonic, and that near $2(f_{m2})$ is designated 2nd second harmonic. If 2nd second harmonic is closer in frequency to $2(f_{m2})$ than 1st second harmonic is to $2(f_{m1})$, then $f_{m2}$ is considered to be the principal harmonic frequency.

It could similarly be determined whether there is a frequency component near $2(f_{m3})$, twice the frequency of the third highest frequency component, $f_{m3}$.

A draw-control computer 47, which may comprise a Digital 11/73, contains algorithms for controlling tractor speed, preform downfeed and furnace temperature. The diameter of fiber 14 is measured by monitor 15 which provides the draw-control computer with a signal that allows the linear density of the fiber to be calculated dynamically. The characteristic length of the vibrating portion of the fiber can be measured from the actual equipment dimensions, but it is preferably determined experimentally. The characteristic length can be determined together with the calibration of the system by measuring the principal harmonic frequency and then using a three wheel contact tensiometer to periodically measure the actual tension. This calibration step need be done only during the initial installation of the equipment unless there is a change in equipment configuration. As a precaution, the calibration step could be performed occasionally, for example, anually.

A signal proportional to the principal frequency component is sent to the draw-control computer which then calculates the fiber tension T by combining the frequency together with the current fiber diameter in a calculation utilizing the equation $$T = \alpha + \beta d^2 v^2 \qquad \text{Eq. 2}$$

where d is the fiber diameter, v is the principal harmonic frequency, and α and β are experimentally determined constants representing bundled parameters from Equation 1. As shown in FIG. 1, a signal from control algorithm 48 is fed to temperature control circuit 49 (which may be a part of draw computer 47) which, in turn, controls the temperature of heating element 12. The furnace temperature could be controlled so as to maintain draw tension substantially constant, for example.

The following system was employed to implement the present invention.

Figure 2:
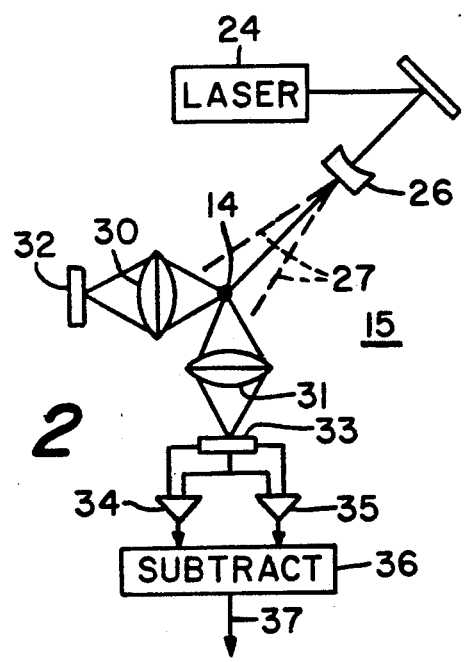
FIG. 2 is a schematic diagram of the fiber position monitor of FIG. 1.

The measurement of fiber vibration was performed by the optical device shown in FIG. 2. Light from laser 24 is spread in the horizontal axis by cylindrical lens 26 to provide a relatively large area over which fiber can move and be illuminated. Dashed lines 27 illustrate the extent of light spreading. The light strikes fiber 14 and is both reflected and refracted in all directions; it is mostly refracted in the forward angles. Since the fiber is relatively small compared to the dimensions of the remainder of the system, the fiber effectively appears as a point source of spread light. Lenses 30 and 31 are positioned about 1.2 inches away from the fiber to refocus the image of the illuminated fiber to points on the surface of detectors 32 and 33, respectively. The distance of the fiber from the lenses, the distance of the detectors from the lenses, and the focal length of the lenses determine the magnification of the system. The magnification is the ratio of fiber movement normal to the central axis of a lens to the movement of the refocused spot on the respective detector. Detectors 32 and 33 are commercially available lateral effect cell of the type disclosed in the publication, L.S. Watkins, "Laser Beam Refraction . . . Gradient Profile", Applied Optics, vol. 18, No. 13, 1 July 1979, pp 2214–2222. Each of these detectors is a single element silicon detector having two anodes and one cathode. The relative difference between potentials at the two anodes and the common cathode is a measure of the position of the light focused on the detector. As the light spot moves along the length of the detector, the potential difference between the anodes and the common cathode will also change. If the spot is centered on a detector, the potentials will be equal. Since the lens refocuses the image of the illuminated fiber onto the detector, the potential difference can be related to the position of the fiber. Two detectors are used to simultaneously measure the position of the fiber in two perpendicular planes. The signals from both detectors are used in a feedback loop to position of the preform in the x-y (horizontal) plane.

Since the output signals from only one of the detectors is needed to supply vibration information, the output circuit of only detector 33 is illustrated. In a specific embodiment, vibration was measured in a plane normal to the face of the draw tower. The two output signals from detector 33 are amplified by amplifiers 34 and 35 and the amplifier outputs are subtracted in circuit 36 to obtain the difference signal at output 37. A commercially available amplifier was used to perform the amplification and subtraction functions. The resulting amplified/difference signal at output 37 is representative of instantaneous fiber position.

Similar amplifier/subtractor circuitry was employed in conjunction with detector 32 to obtain the additional signal required to position preform 10 in the x-y plane.

Figure 3:
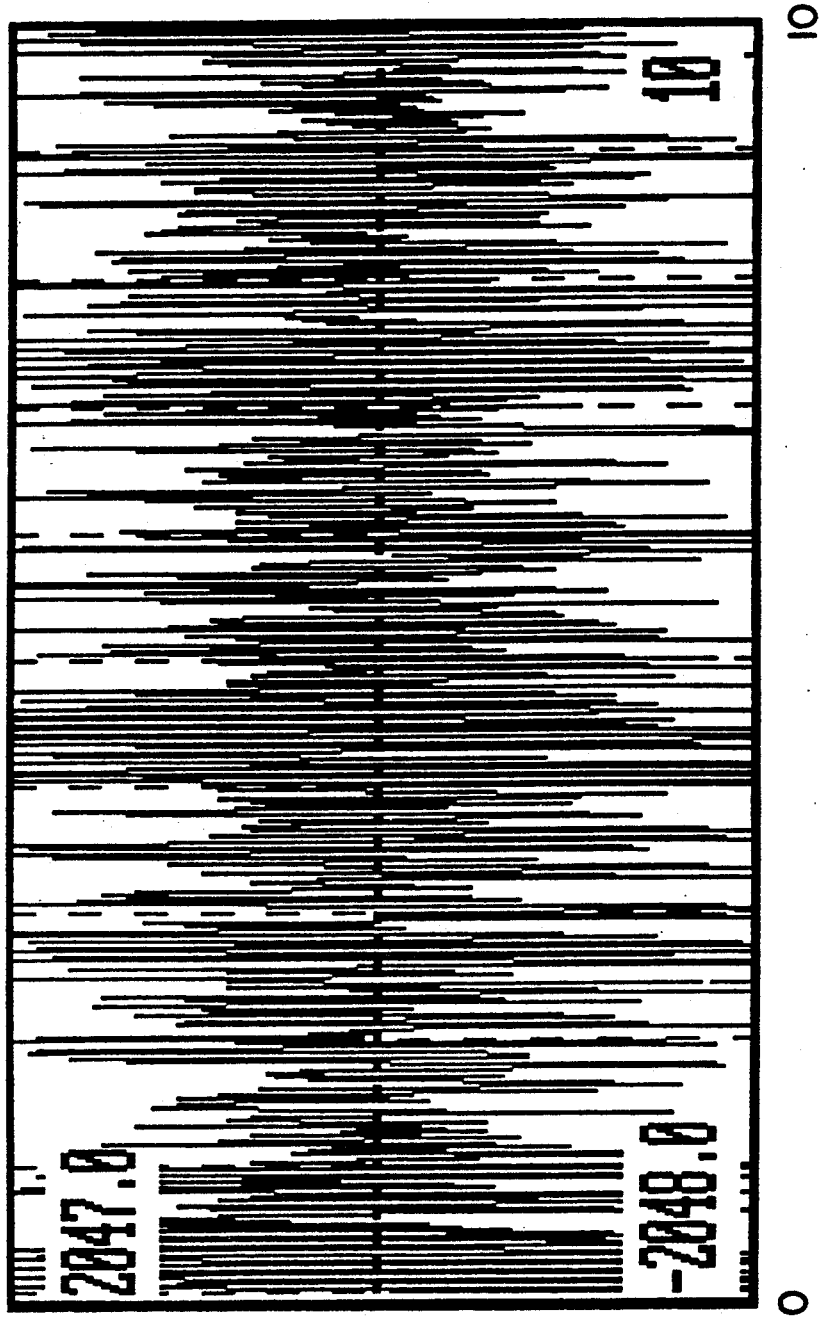
FIG. 3 shows a typical position versus time waveform produced by the bandpass filter of FIG. 1.

The fiber position signal appearing at terminal 37 is coupled to analog-to-digital converter 41 by bandpass filter/amplifier 39. In addition to providing an amplification of 50 times, circuit 39 couples only frequencies between 1 and 40 Hz to A/D converter 41. The filtering is necessary to remove the nominal fiber position signal and leave only the vibrational information, as well as remove any high frequency noise that could be aliased in the resulting calculations. A typical position versus time waveform produced by circuit 39 is shown in FIG. 3.

The amplified fiber position signal is converted to a digital signal by analog to digital converter 41 which samples the position signal 100 times a second, with a resolution of 12 bits. The period between samples is assured since a high resolution electronic clock, that is internal to converter 41, is used as a reference. During a time period of 10.24 seconds, 1024 data points are collected. The sample time and number of data points determine the resolution and operating range of the device.

The actual tension of the fiber is constantly changing by several grams. The greatest contributor toward this tension variation is the fiber diameter control circuit. Tractor speed is adjusted periodically, e.g. once per second. As the diameter becomes greater than or less than the setpoint value, the tractor pulls the fiber faster than or slower than some average pull rate. Fiber tension varies since it is a function of pull rate. For this reason the magnitude spectrums are averaged as discussed below in calculation step 3. The fiber movement also contains many components that are not part of the standing wave system. Algorithms were developed for the purpose of determining an accurate, reliable, and stable reading of tension in the presence of this noise. In the nine calculation steps described below in detail, steps 1 through 5 were performed by array processor 45, a Model 7020 data translator, and steps 6 through 9 were then performed by supervisory computer 46, an 80386 microprocessor based computer. In order to perform calculation steps 1 through 9, these commercially available computers were programmed in accordance with conventional programming techniques.

Figure 8:
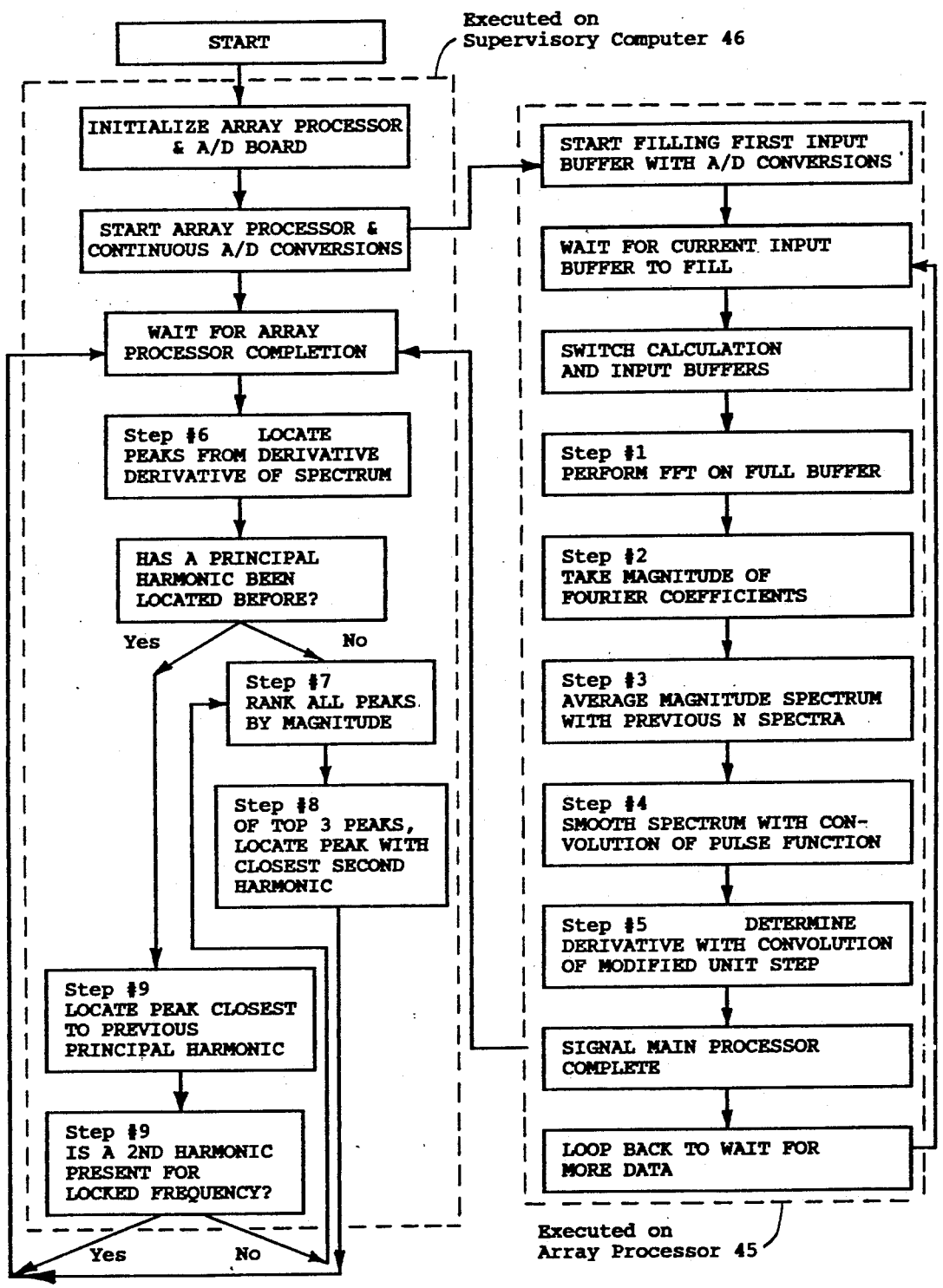
FIG. 8 is a flow chart depicting the computer aided process for determining the principal harmonic frequency of motion of a fiber.

FIG. 8 depicts the computer aided process for determining the principal harmonic frequency of the motion of the fiber as detected by position monitor 16. The specific calculation step number is indicated in the appropriate function block or blocks of the flow diagram. As indicated below the box labelled "start", computer 46 initializes array processor 45 and A/D converter 41 and also starts the operation of those devices. The step of initializing the array processor comprises loading the operating sequence and initial data values in its memory. The step of initializing the A/D converter comprises providing it with initial data values such as operating speed and gain.

CALCULATIONS

1. The Fast Fourier Transform (FFT) is the first in a series of calculations performed to determine the fundamental frequency of the fiber vibration. The FFT is calculated on the last set of digitized data which comprises 1024 data points. This calculation yields 512 unique complex Fourier coefficients.

Figure 4:
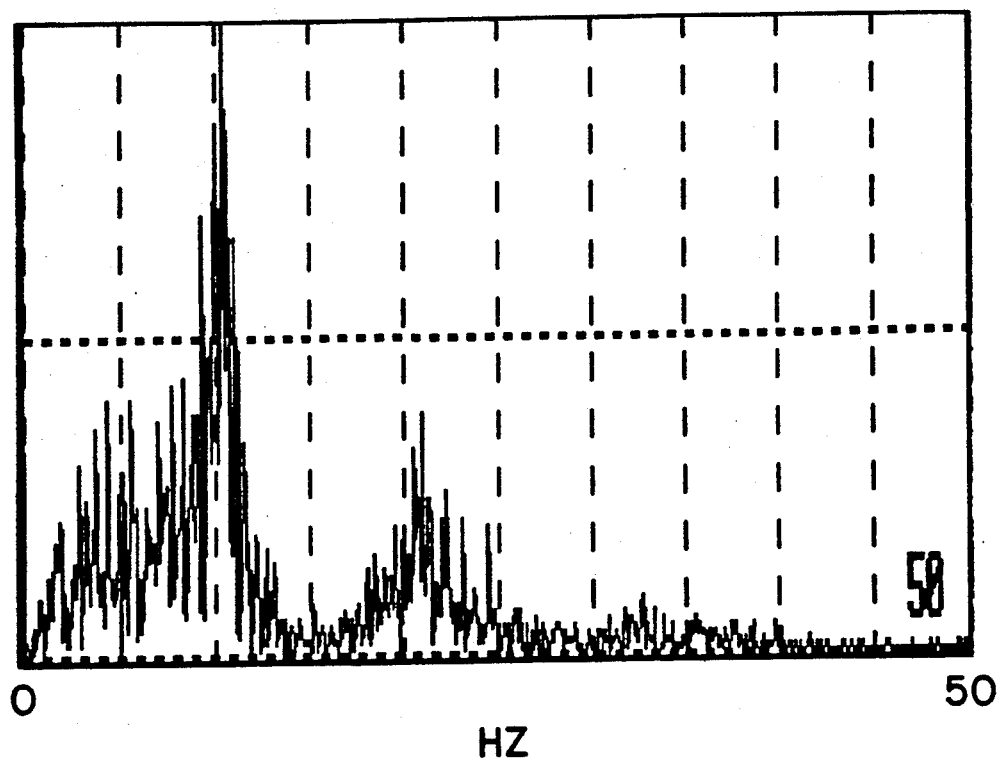
FIG. 4 shows the Fouriew transform of the fiber position signal of FIG. 3.

2. The magnitude of the complex Fourier coefficients is determined by taking the square root of the sum of the squares of the real and imaginary values of the complex Fourier coefficients. This yields 512 real numbers (½ the number of data points), and is referred to as the magnitude spectrum. A typical result of this calculation can be seen in FIG. 4.

3. The current magnitude spectrum is averaged together with the last 8 previously calculated magnitude spectra (more or less than 8 can be used). The result here continues to be 512 real numbers.

Figure 5:
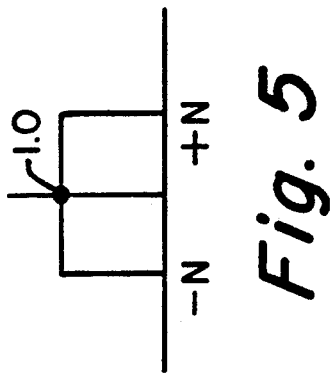
FIG. 5 shows a unit pulse function utilized to digitally smooth the waveform of FIG. 4.
Figure 6:
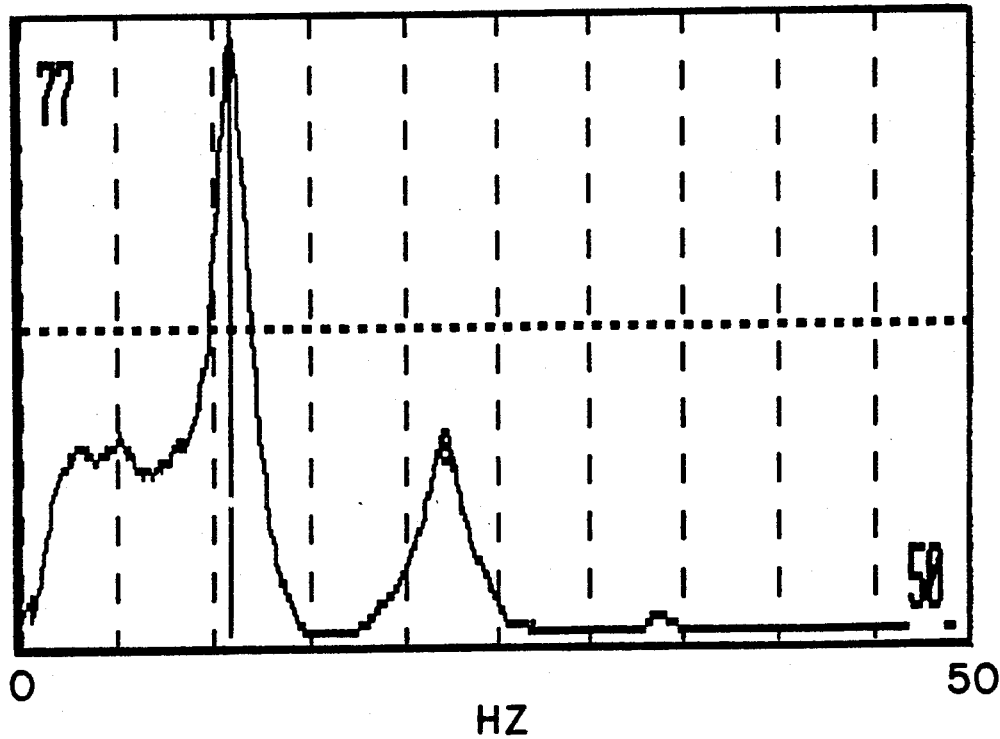
FIG. 6 shows the smoothed Fourier spectrum.

4. The result of the averaging operation is digitally smoothed. This is accomplished by convolving the result from step 3 with a unit pulse function. This operation is similar to "boxcar averaging". The unit pulse function can be seen in FIG. 5. The array processor used to perform the calculations is incapable of performing a convolution operation, so in practice the FFT is calculated for both the unit pulse and the average spectrum, and the two complex arrays are multiplied together. The inverse FFT of the result is then calculated. This property of convolutions and FFTs is very common. The result of this step is again an array of 512 real data points. To increase the amount of smoothing, the unit pulse function is made wider. If a width of the unit pulse function is only 1, then no smoothing will take place. A typical result of this operation can be seen in FIG. 6 which resulted from a digital smoothing operation wherein the width N of the unit step function was 6.

Figure 7:
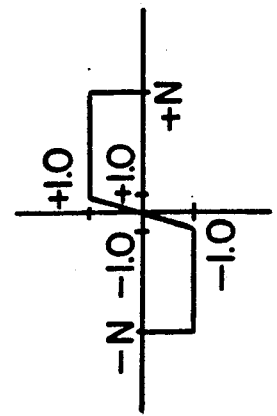
FIG. 7 shows a modified unit step function utilized to obtain the derivative of the spectrum of FIG. 6.

5. The result of step 4 is convolved again, but this time with the modified unit step function shown in FIG. 7 wherein the width N is 6. The actual calculation is performed as outlined in step 4 (multiplying FFTs). That is, the array processor calculates the FFTs for both the modified unit step function of FIG. 7 and the smoothed signal shown in FIG. 6, and the two complex arrays are multiplied together. The inverse FFT of the result is then calculated. The result of this step is an array of 512 real numbers representing the derivative of the result from step 4. The derivative is effectively the derivative over the width of the modified unit step function used in the convolution. If the width of the modified unit step function is increased, the result of this calculation is made smoother, but resolution is lost.

6. The result from step 5 is now scanned to locate all frequency "peaks", i.e. points where the slope of the smoothed frequency spectrum is 0. This is found by locating all points in the array result of step 6 where the result was zero. In most cases, due to the number of finite points available, the exact location of a zero derivative is not known since it does not lie on an exact point. Therefore, a peak is also defined as being located between two points and as having positive slope on the lower (or left) side and negative slope on the upper (or right) side. In addition, to prevent detection of points in the noise of the spectrum, it is also required that the magnitude of the smoothed spectrum at the point of a proposed peak be above a threshold. In summary, the result of this step is a list of all points in the result of step 5 where the value is 0, or the adjacent values have opposing signs, and the magnitude at the same point, as indicated from step 4, is greater than the noise threshold.

7. The frequency peaks obtained from step 6 are ranked according to magnitude. The peak with the greatest magnitude is ranked first, etc.

8. The top 3 peaks are analyzed for the presence of a second harmonic. The peak with another peak located nearest to the location of an ideal second harmonic is indicated as the fundamental frequency. If none of the top peaks has another peak within 1.5 Hz of the location of an ideal second harmonic, then, as a safety measure, no fundamental frequency is indicated.

9. Steps 1 through 8 could be repeated periodically. However, once a fundamental frequency has been located, it is preferred that the calculations "lock" onto that frequency. For subsequent calculations of the algorithm, only the frequency peak within the "lock range" of the previous calculation is considered in steps 7 and 8. If no frequency is found within the lock range, then the full algorithm is evaluated. This is used to prevent a false signal from being considered in the calculations. In practice, it is not possible for the frequency to change very rapidly, so narrowing the range over which the algorithm looks for the fundamental frequency provides a measure of reality to the algorithm. A useful frequency range in which to look for the fundamental frequency is 2 Hz. The condition that a second harmonic exist is still required even when a peak is within the lock range.

The following hypothetical example is typical of the operation of the method of the invention. The performance of step 6 in computer 46 results in the generation of the following table of frequency peaks:

| Frequency (Hz) | Magnitude |
|---|---|
| 8.1 | 75 |
| 11.0 | 90 |
| 16.5 | 35 |
| 23.1 | 20 |
| 30.0 | 17 |

The performance of step 7 results in the following magnitude ranking:

| Frequency (Hz) | Magnitude |
|---|---|
| 11.0 | 90 |
| 8.1 | 75 |
| 16.5 | 35 |
| 23.1 | 20 |
| 30.0 | 17 |

In step 8, the top three peaks are analyzed for the presence of a second harmonic.

| Freq. (Hz) | Freq. × 2 | Frequency Closest to Freq. × 2 | Difference |
|---|---|---|---|
| 11.0 | 22.0 | 23.1 | 1.1 |
| 8.1 | 16.2 | 16.5 | 0.3 |
| 16.5 | 33.0 | 30.0 | 3.0 |

It is determined that 8.1 Hz is the principal harmonic, since another frequency peak exists only 0.3 Hz from its ideal 2nd harmonic. The frequency component having the greatest magnitude is excluded since the difference between 22.0 Hz (2 times 11.0 Hz) and the closest frequency peak is 1.1 Hz, a difference that is greater than 0.3 Hz. The third highest frequency peak, 16.5 Hz, is excluded from consideration since the closest frequency peak is 3.0 Hz from the ideal 2nd harmonic, a difference that is outside the 1.5 Hz allowable difference. The peaks at 10.5 Hz and 16.5 Hz are therefore noise.

What is claimed is:
1. A method for monitoring the tension in a moving fiber comprising the steps of:

sensing the motion of the fiber in a direction transverse to the direction in which the fiber is moving;

analyzing the sensed motion to determine a plurality of frequency components thereof, each frequency component having a magnitude, and selecting one of the frequency components, $f_{m1}$, as constituting the maximum magnitude component;

doubling the frequency of the maximum magnitude component to obtain a doubled frequency, $2(f_{m1})$;

ascertaining the presence of a frequency component near said doubled frequency, $2(f_{m1})$, to verify that the maximum magnitude component is the principal harmonic frequency of motion of the fiber;

determining the tension in said fiber from the verified principal harmonic frequency component;

2. The method of claim 1 wherein the step of analyzing comprises selecting from said plurality of frequency components at least the first and second highest magnitude frequency components, $f_{m1}$ and $f_{m2}$, respectively;

the step of doubling further comprises doubling frequency component $f_{m2}$ to obtain frequency $2(f_{m2})$; and the step of ascertaining comprises checking said plurality of frequency components to determine the presence of a frequency component near frequency $2(f_{m1})$, a frequency component near $2(f_{m1})$ being designated the 1st second harmonic, checking said plurality of frequency components to determine the presence of a frequency component near frequency $2(f_{m2})$, a frequency component near $2(f_{m2})$ being designated the 2nd second harmonic, and selecting said 2nd second harmonic as the principal harmonic if said 2nd second harmonic is closer in frequency to $2(f_{m2})$ than said 1st second harmonic is to $2(f_{m1})$.

3. The method of claim 2 wherein the step of sensing comprises heating an optical fiber preform in a draw furnace,
pulling an optical fiber from said preform,
passing said fiber through coating means where a coating is applied to said optical fiber, and
sensing the motion of said fiber at a location between said preform and said coating means.

4. The method of claim 3 further comprising the step of controlling the temperature of said draw furnace in response to the ascertained fiber tension.

5. The method of claim 3 further comprising the step of controlling the temperature of said draw furnace in response to the ascertained fiber tension to maintain the tension of said fiber substantially constant until the step of pulling has been terminated.

6. The method of claim 1 wherein the step of sensing comprises heating an optical fiber preform in a draw furnace,
pulling an optical fiber from said preform,
passing said fiber through coating means where a coating is applied to said optical fiber, and
sensing the motion of said fiber at a location between said preform and said coating means.

7. The method of claim 6 further comprising the step of controlling the temperature of said draw furnace in response to the ascertained fiber tension.

8. The method of claim 6 further comprising the step of controlling the temperature of said draw furnace in response to the ascertained fiber tension to maintain the tension of said fiber substantially constant until the step of pulling has been terminated.

9. The method of claim 1 further comprising the step of controlling the temperature of said draw furnace in response to the ascertained fiber tension.

10. The method of claim 1 further comprising the step of controlling the temperature of said draw furnace in response to the ascertained fiber tension to maintain the tension of said fiber substantially constant until the step of pulling has been terminated.

11. A method for monitoring the tension in a moving fiber comprising the steps of:

heating an optical fiber preform in a draw furnace,
pulling an optical fiber from said preform,
passing said fiber through coating means where a coating is applied to said optical fiber, and
sensing the motion of said fiber in a direction transverse to the direction in which the fiber is moving, said motion being sensed at a location between said preform and said coating means;

analyzing the sensed motion to determine a plurality of frequency components thereof, each frequency component having a magnitude, and selecting one of the frequency components, $f_{m1}$, as constituting the maximum magnitude component;

doubling the frequency of the maximum magnitude component to obtain a doubled frequency, $2(f_{m1})$;

ascertaining the presence of a frequency component near said doubled frequency, $2(f_{m1})$, to verify that the maximum magnitude component is the principal harmonic frequency of motion of the fiber;

determining the tension in said fiber from the verified principal harmonic frequency component; and controlling the temperature of said draw furnace in response to the ascertained principal harmonic frequency of motion of said fiber.

12. The method of claim 11 wherein the step of analyzing comprises selecting from said plurality of frequency components at least the first and second highest magnitude frequency components, $f_{m1}$ and $f_{m2}$, respectively;

the step of doubling further comprises doubling frequency component $f_{m2}$ to obtain frequency $2(f_{m2})$; and the step of ascertaining comprises checking said plurality of frequency components to determine the presence of a frequency component near frequency $2(f_{m1})$, a frequency component near $2(f_{m1})$ being designated the 1st second harmonic, checking said plurality of frequency components to determine the presence of a frequency component near frequency $2(f_{m2})$, a frequency component near $2(f_{m2})$ being designated the 2nd second harmonic, and selecting said 2nd second harmonic as the principal harmonic if said 2nd second harmonic is closer in frequency to $2(f_{m2})$ than said 1st second harmonic is to $2(f_{m1})$.

13. The method of claim 12 wherein the step of controlling comprises controlling the temperature of said draw furnace to maintain the tension of said fiber substantially constant until the step of pulling has been terminated.

14. The method of claim 11 wherein the step of controlling comprises controlling the temperature of said draw furnace to maintain the tension of said fiber substantially constant until the step of pulling has been terminated.

* * * * *